(12) United States Patent
　　Hong et al.

(10) Patent No.:　US 12,643,096 B2
(45) Date of Patent:　　Jun. 2, 2026

(54) DEVICE FOR TESTING A ANALYTE IN A LIQUID SAMPLE

(71) Applicant: Hangzhou Biotest Biotech Co., LTD., Hangzhou (CN)

(72) Inventors: Liang Hong, Hangzhou (CN); Hui Geng, Hangzhou (CN)

(73) Assignee: HANGZHOU BIOTEST BIOTECH CO., LTD, Hangzhou (CN)

( * ) Notice: Subject to any disclaimer, the term of this patent is extended or adjusted under 35 U.S.C. 154(b) by 786 days.

(21) Appl. No.: 17/969,572

(22) Filed: Oct. 19, 2022

(65) Prior Publication Data

US 2023/0128976 A1　　Apr. 27, 2023

Related U.S. Application Data

(60) Provisional application No. 63/270,284, filed on Oct. 21, 2021.

(30) Foreign Application Priority Data

Oct. 21, 2021　(CN) .......................... 202111225731.2

(51) Int. Cl.
　　*B01L 3/00*　　　　(2006.01)
　　*G01N 21/77*　　　(2006.01)
　　*G01N 21/78*　　　(2006.01)

(52) U.S. Cl.
　　CPC ............ *B01L 3/5023* (2013.01); *G01N 21/78* (2013.01); *B01L 2300/044* (2013.01);
　　　　　　　(Continued)

(58) Field of Classification Search
　　CPC ............. B01L 3/5023; B01L 2300/044; B01L 2300/0672; B01L 2300/069; B01L
　　　　2300/0864; B01L 2200/16; B01L
　　　　2300/0663; B01L 2300/0832; B01L
　　　　2300/0867; B01L 2400/0478; B01L
　　　　2400/065; B01L 2400/0683; B01L
　　　　　　　　　　　　　　3/5029;
　　　　　　　　(Continued)

(56) References Cited

U.S. PATENT DOCUMENTS 4,857,453　A　　8/1989　Ullman et al.
5,073,484　A　　12/1991　Swanson et al.
　　　　　　(Continued)

FOREIGN PATENT DOCUMENTS

CN　　　105829861　A　　8/2016
CN　　　111596071　A　　8/2020

*Primary Examiner* — Dennis White
(74) *Attorney, Agent, or Firm* — MUNCY, GEISSLER, OLDS & LOWE, P.C.

(57)　　　　　　ABSTRACT

The invention provides a device for detecting an analyte in a liquid sample. The device comprises a receiving chamber for receiving an absorbent element, wherein the absorbent element is used for collecting a liquid sample; and a detection chamber configured to receive a testing element, wherein the testing element is set to test an analyte in a liquid sample, the receiving chamber is provided with a first position and a second position, when the receiving chamber is located at the first position, the receiving chamber is not in fluid communication with the detection chamber, and when the receiving chamber is located at the second position, the receiving chamber is in fluid communication with the detection chamber.

14 Claims, 14 Drawing Sheets

(52) U.S. Cl.
CPC . *B01L 2300/0672* (2013.01); *B01L 2300/069* (2013.01); *B01L 2300/0864* (2013.01); *G01N 2021/7759* (2013.01)

(58) Field of Classification Search
CPC ........... G01N 21/78; G01N 2021/7759; G01N 2001/028
See application file for complete search history.

(56) References Cited

U.S. PATENT DOCUMENTS

| | | | |
|---|---|---|---|
| 5,119,831 A | 6/1992 | Robin et al. | |
| 5,185,127 A | 2/1993 | Vonk | |
| 5,275,785 A | 1/1994 | May et al. | |
| 5,352,410 A | 10/1994 | Hansen et al. | |
| 5,376,337 A | 12/1994 | Seymour | |
| 5,416,000 A | 5/1995 | Allen et al. | |
| 5,504,013 A | 4/1996 | Senior | |
| 5,576,009 A | 11/1996 | Nastke et al. | |
| 5,602,040 A | 2/1997 | May et al. | |
| 5,622,871 A | 4/1997 | May et al. | |
| 5,654,162 A | 8/1997 | Guire et al. | |
| 5,656,503 A | 8/1997 | May et al. | |
| 5,686,315 A | 11/1997 | Pronovost et al. | |
| 5,766,961 A | 6/1998 | Pawlak et al. | |
| 5,770,460 A | 6/1998 | Pawlak et al. | |
| 5,916,815 A | 6/1999 | Lappe | |
| 5,976,895 A | 11/1999 | Cipkowski | |
| 6,140,136 A | 10/2000 | Lee | |
| 6,187,269 B1 | 2/2001 | Lancesseur et al. | |
| 6,187,598 B1 | 2/2001 | May et al. | |
| 6,228,660 B1 | 5/2001 | May et al. | |
| 6,235,241 B1 | 5/2001 | Catt et al. | |
| 6,248,598 B1 | 6/2001 | Bogema | |
| 6,277,646 B1 * | 8/2001 | Guirguis ................. | B01L 3/502 422/417 |
| 6,306,642 B1 | 10/2001 | Nelson et al. | |
| 6,352,862 B1 | 3/2002 | Davis et al. | |
| 6,372,515 B1 | 4/2002 | Casterlin et al. | |
| 6,379,620 B1 | 4/2002 | Tydings et al. | |
| 6,403,383 B1 | 6/2002 | Casterlin et al. | |
| 2011/0144535 A1 * | 6/2011 | Guirguis ............... | A61B 5/157 600/573 |
| 2017/0227536 A1 * | 8/2017 | Matsuura ......... | G01N 33/54388 |

* cited by examiner

1041

104

1042

1044

1043

108

1058

1057

105

1051

107

106

1021

1026

102

1087

1084

1083

108

1085

201

203

202

2012

2021

2022

2023

2024    207    204

206

201
2026
2027
202
2025

2041
204
2042
2084
2051
2052
2085

2012

201

2043

2044

207

206

201

202

205

203

2041

2025

2011

2051

207

206

300

301

DEVICE FOR TESTING A ANALYTE IN A LIQUID SAMPLE

The present application claims priority to a Chinese prior application No. 202111225731.2 filed on Oct. 21, 2021 and U.S. provisional application No. 63/270,284 filed on Oct. 21, 2021; and the entire contents of the above application, including the description, claims, abstract and accompanying drawings are incorporated herein as a portion of the present invention.

TECHNICAL FIELD

The present invention relates to a device for collecting a liquid sample, in particular to a device for collecting and detecting an analyte in a liquid sample in the field of rapid diagnosis, such as a urine and saliva collection and detection device.

BACKGROUND

The following description is merely an introduction of some background general knowledge and does not constitute any limitation to the present invention. At present, detection devices for detecting whether a sample contains an analyte are widely used in hospitals or at home, and the detection devices for rapid diagnosis comprise one or more detection reagent strips used for early pregnancy detection, drug abuse detection and the like. The rapid diagnosis detection devices are very convenient, and detection results can be obtained on the detection reagent strips in one minute, or at most about ten minutes.

Drug detection is widely used, often in drug control departments, public security bureaus, drug rehabilitation centers, physical examination centers, national conscription medical examination offices and other institutions. Drug detection is frequently used and various in types. Some require the collection of samples, then the samples need to be detected by a professional testing agency or testing laboratory. Some need to be completed on site in a timely manner, for example people who drive after taking drugs ("drugged drivers") need to be detected on site, and then detection results are obtained in a timely manner.

For example, the detection of saliva samples is becoming more accepted and popular among testing agencies or testing personnel based on convenient collection. In some literatures, various sample collecting and detecting devices for clinical or domestic uses have been obtained and described. For example, the U.S. Pat. No. 5,376,337 discloses a saliva sampling device in which a piece of filter paper is used to collect saliva from the mouth of a subject and deliver saliva to an indicator reagent. U.S. Pat. Nos. 5,576,009 and 5,352,410 each disclose a syringe-type fluid sampling device.

In view of the above technical problems, some improvement is needed, and an alternative approach needs to be provided to solve the drawbacks of the prior art.

SUMMARY

In a first aspect, the invention provides a device comprising a receiving chamber and a detection chamber; the detection chamber is configured to receive a testing element; the testing element is set to test an analyte in a liquid sample; and the receiving chamber is provided with a first position and a second position, when the receiving chamber is located at the first position, the receiving chamber is not in fluid communication with the detection chamber, and when the receiving chamber is located at the second position, the receiving chamber is in fluid communication with the detection chamber.

In some embodiments, when the receiving chamber is in the second position, the receiving chamber is in fluid communication with the detection chamber, and liquid in the receiving chamber flows to the detection chamber. In some embodiments, the receiving chamber contains a mixed solution. In some embodiments, the receiving chamber is configured to receive an absorbent element and lock the absorbent element in the receiving chamber, or the receiving chamber is configured to directly receive a fluid sample.

In some embodiments, the absorbent element is provided with an uncompressed state or a compressed state within the receiving chamber. In some embodiments, after the absorbent element is compressed, the absorbent element is locked in the receiving chamber. In some embodiments, the receiving chamber is provided with treatment liquid in which a sample is previously stored, and when the absorbent element is inserted into the receiving chamber, the absorbent element contacts the treatment liquid, thereby forming a first mixed solution. In some embodiments, the movement of the receiving chamber from the first position to the second position is lifted by means of a lifting part in the receiving chamber.

In some embodiments, the device further comprises a chamber containing a mixed solution, and when the absorbent element is in a compression process, the mixed solution flows from a mixed solution chamber into the receiving chamber to contact the absorbent element. In some embodiments, the mixed solution chamber is located within the receiving chamber, and the mixed solution chamber is sealed by a puncture-prone film.

In some embodiments, the device further comprises a puncture element, and the absorbent element pushes the puncture element in the compression process of the absorbent element, thereby puncturing the sealing film. In some embodiments, the puncture element is positioned within the receiving chamber above the mixed solution chamber. In some embodiments, when the absorbent element is inserted into the receiving chamber, the absorbent element pushes the puncture element to puncture the mixed solution chamber, thereby releasing the mixed solution from the mixed solution chamber into contact with the absorbent element or mixing with the liquid sample released from the absorbent element. In some embodiments, the receiving chamber is sealed when the mixed solution is contained in the receiving chamber.

In some embodiments, the receiving chamber includes a solution outlet, the detection chamber includes a solution inlet, and when the receiving chamber is in the first position, the solution outlet of the receiving chamber is not in fluid communication with the solution inlet of the detection chamber. In some embodiments, the solution outlet on the receiving chamber is not aligned with or staggered from the solution inlet on the detection chamber. In some embodiments, the solution outlet is positioned below the solution inlet, so that liquid in the accommodating chamber cannot flow into the detection chamber through the solution inlet of the detection chamber.

In some embodiments, the receiving chamber includes a solution outlet, the detection chamber includes a solution inlet, and when the receiving chamber is in the second position, the solution outlet of the receiving chamber is in fluid communication with the solution inlet of the detection chamber. In some embodiments, the solution outlet on the receiving chamber is aligned with the solution inlet on the detection chamber, so that the liquid in the receiving chamber can flow into the detection chamber through the solution inlet.

In some embodiments, wherein the receiving chamber is moved relative to the detection chamber from the first position to the second position to allow the solution outlet of the receiving chamber to proximate to the solution inlet of the detection chamber. In some embodiments, the receiving chamber cannot continue to move after moving to the second position. In some embodiments, the solution outlet in the receiving chamber is positioned below the solution inlet of the detection chamber, so that the receiving chamber moves upward from below the solution inlet to the second position to allow the solution outlet to be aligned with the solution inlet. After alignment, the receiving chamber cannot continue to move upwards.

In some embodiments, the device further comprises an accommodating chamber accommodating the receiving chamber, the receiving chamber is provided with the first position and the second position within the receiving chamber. In some embodiments, wherein a sealing element is provided between the receiving chamber and the accommodating chamber. In some embodiments, wherein the sealing element is positioned between the solution outlet of the receiving chamber and the solution inlet of the detection chamber. In some embodiments, the sealing element is positioned adjacent to the solution outlet of the receiving chamber, and preferably two sealing elements are provided, and the two sealing elements are respectively located at the upper side and lower side of the solution outlet of the receiving chamber, so that liquid from the solution outlet cannot enter the accommodating chamber. In some embodiments, a side wall of the accommodating chamber is same to a side wall of the detection chamber, and the solution inlet of the detection chamber is located on the same side wall.

In a second aspect, the present invention provides a method for detecting an analyte in a sample, the method comprises providing a device, and the device comprises a receiving chamber for receiving an absorbent element and a detection chamber for receiving a testing element, wherein the absorbent element is used for receiving a liquid sample, and the testing element is set to test the analyte in the liquid sample;

and the receiving chamber is located at a first position and a second position, when the receiving chamber is located at the first position, the receiving chamber is not in fluid communication with the detection chamber, and when the receiving chamber is located at the second position, the receiving chamber is in fluid communication with the detection chamber.

In some embodiments, the liquid sample is collected with the absorbent element, and the absorbent element is inserted into the receiving chamber. In some embodiments, after the absorbent element is locked in the receiving chamber, the receiving chamber moves the absorbent element together when the receiving chamber moves from the first position to the second position. In some embodiments, the absorbent element is compressed, thereby releasing the liquid sample. In some embodiments, the absorbent element is locked in a receiving element to allow the receiving chamber to be located at the first position. In some embodiments, the mixing solution is brought into contact with the absorbent element or mixed with the liquid sample. In some embodiments, the absorbent element is disposed on a rod-shaped structure, one end of the rod-shaped structure is connected with the absorbent element, and the other end of the rod-shaped structure is connected with an opening cover body covering the receiving chamber. The cover body is pulled to move the receiving chamber from the first position to the second position.

In some embodiments, the receiving chamber is provided with the solution outlet, the detection chamber is provided with the solution inlet, and when the receiving chamber is located at the first position, the solution outlet in the receiving chamber is not aligned with the solution inlet in the detection chamber; and when the receiving chamber is located at the second position, the solution outlet in the receiving chamber is aligned with the solution inlet in the detection chamber.

BENEFICIAL EFFECTS

By adopting the structure, the analyte in the liquid sample can be detected, and distribution detection can be carried out in way, so that the quantification and the detection rhythm can be controlled.

DETAILED DESCRIPTION OF EMBODIMENTS

Figure 1:
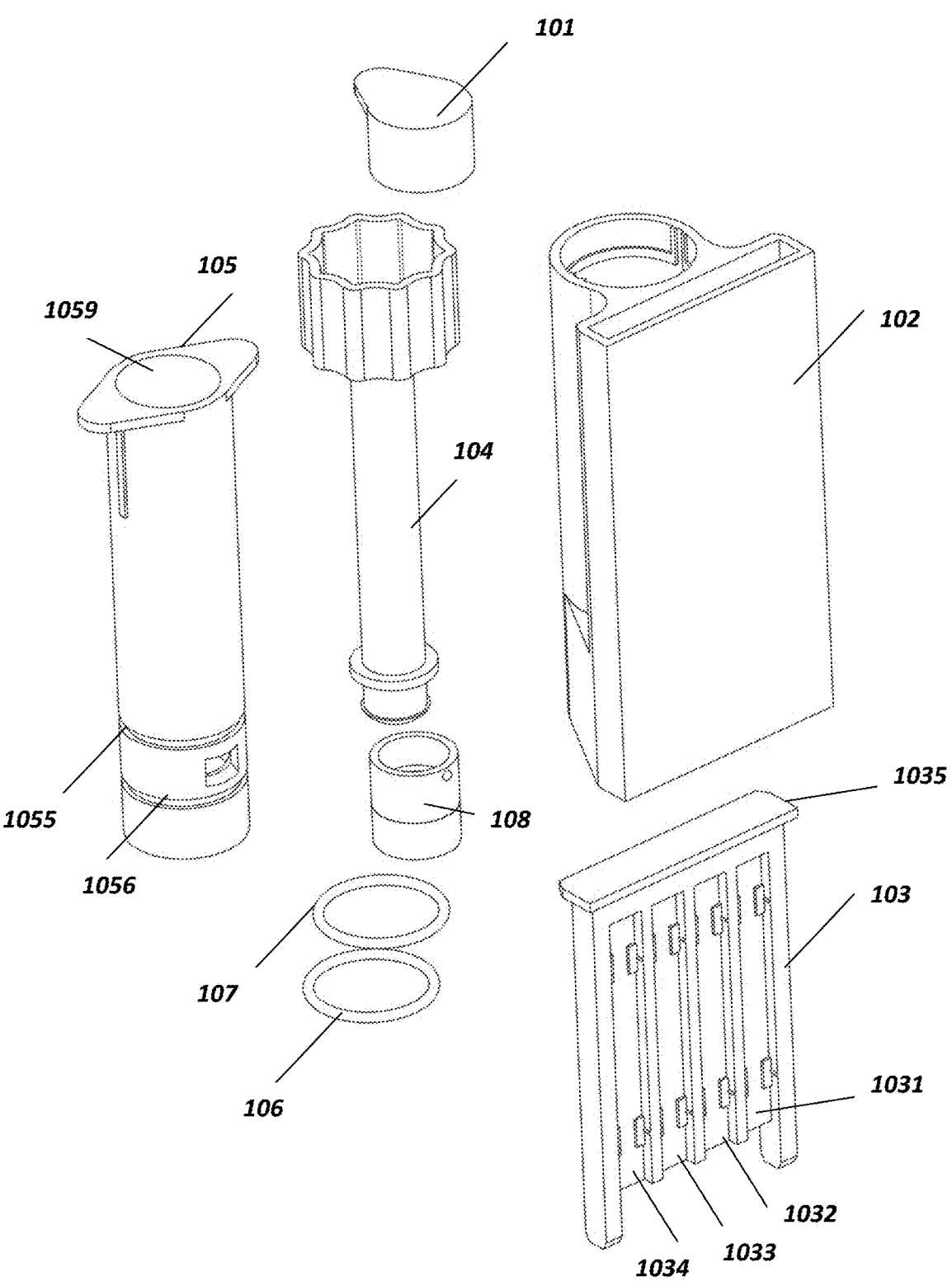
FIG. 1 is a schematic perspective exploded view of a testing device and a collector in an embodiment of the present invention.
Figure 2:
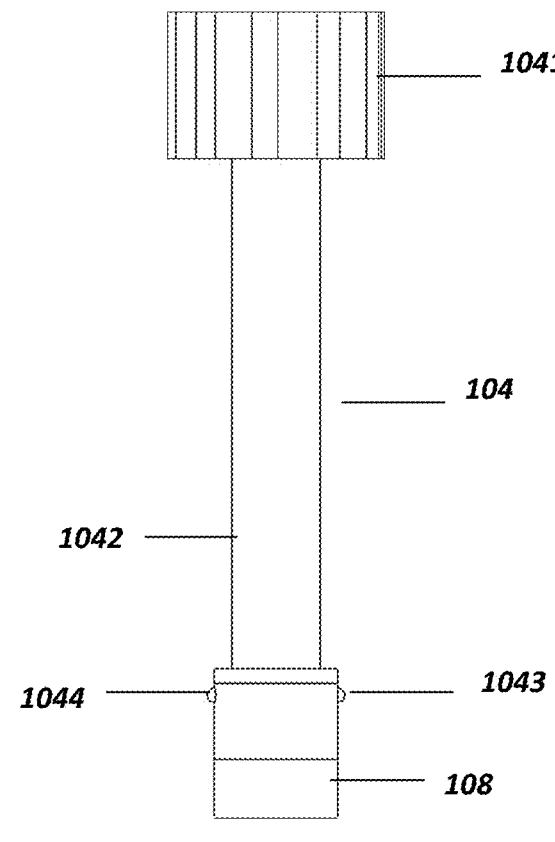
FIG. 2 is a schematic diagram of a specific enlarged structure of a specific collector of the present invention.

The structures involved in the present invention or the technical terms used are further described below and, if not specifically indicated, are understood and interpreted in accordance with general terms commonly used in the art.
Detection Detection means assaying or testing for the presence of a substance or material, such as, but not limited to, a chemical, an organic compound, an inorganic compound, a metabolite, a drug or a drug metabolite, an organic tissue or a metabolite of an organic tissue, a nucleic acid, a protein, or a polymer. In addition, detection indicates the amount of the substance or material tested. Furthermore, the assaying also refers to immunoassay, chemical assay, enzymatic assay, and the like.
Samples Samples collected by the detection device of the present invention include biological fluids (e.g., case liquid or clinical samples). Liquid samples or liquid specimens, or fluid samples or fluid specimens, may be derived from solid or semi-solid samples, including feces, biological tissue, and food samples. The solid or semi-solid samples may be converted to liquid samples by any appropriate methods, such as mixing, mashing, macerating, incubating, dissolving, or digesting the solid samples by enzymolysis in suitable solutions, such as water, phosphate solutions, or other buffer solution. "Biological samples" include animal, plant, and food derived samples, including, for example, human or animal derived urine, saliva, blood and components thereof, spinal fluid, vaginal secretions, sperm, feces, sweat, secretions, tissues, organs, tumors, cultures of tissues and organs, cell cultures, and media. Preferably, the biological sample is urine, and preferably, the biological sample is saliva. Food samples include food processed materials, final products, meat, cheese, wine, milk, and drinking water. Plant samples include samples derived from any plants, plant tissues, plant cell cultures, and media. "Environmental samples" include samples derived from the environment (e.g., liquid samples from lakes or other bodies of water, sewage samples, earthen samples, groundwater, seawater, and waste liquid samples). The environmental samples may further include sewage or other waste water.

Any analyte can be detected using an appropriate detecting element or testing element of the detection device of the present invention. Preferably, the detection device of the present invention is used to detect small drug molecules in saliva and urines. Of course, any form of samples, either initially solid or liquid, can be collected by a collection device or a collector 104 of the detection device, as long as the liquid or liquid samples can be absorbed by an absorbent element. The absorbent element 108 is typically made of a water-absorbent material, is initially dry, and is capable of absorbing a liquid or fluid sample through the capillary or other properties of the absorbent element material. The absorbent material can be any material capable of absorbing liquid, such as sponge, filter paper, polyester fiber, gel, non-woven fabric, cotton, polyester film thin, yarn and so on. Of course, the absorbent element is not necessarily made of an absorbent material and may be made of a non-absorbent material, but holes, threads, caverns are in the absorbent element, samples can be collected in these structures, the samples are generally solid or semi-solid samples, and the samples are filled between threads and in cavities or holes.

The treatment liquid is a solution or reagent used for treating a liquid sample, and the treatment liquid is different from the liquid sample, is generally a solution prepared in advance, can be used for eluting or treating the absorption element and can also be used for treating the liquid sample, for example, adjusting the PH value to reduce non-specific binding and avoid false positives or false negatives. By treating the liquid sample, the properties of the analyte in the sample for immunological testing on a test strip. Generally, the treatment liquid does not contain the analyte, and does not contain components with the same property as the sample. Therefore, after the treatment liquid is mixed with the liquid sample, the new mixed solution can flow to the detection chamber together to be in contact with the testing element.
Downstream and Upstream Downstream or upstream is divided according to the flow direction of the liquid, and generally the liquid flows from the upstream to the downstream region. The downstream region accepts the liquid from the upstream area, and the liquid may also flow along the direction from the upstream area to the downstream area. The downstream or the upstream is generally divided according to the flow direction of the liquid, for example, on some materials that utilize capillary forces to urge the liquid to flow, the liquid may overcome gravity and flow in the opposite direction of the gravity, in which case, the upstream and the downstream are also divided according to the flow direction of the liquid. For example, in the detection device of the present invention, when a liquid sample or a sample is absorbed by the absorption element, the liquid can flow from the solution outlet of the receiving chamber 105 into the detection chamber 102, contact the testing element 300 thereon, and flow to a sample area 3001 of the testing element 300, and in the case, the flow of the liquid from the sample loading area 3001 to an absorption area 3005 is from the upstream to the downstream, in the process of the flowing, the liquid passes through a testing area 3002, and the testing area is provided with a detection area 3003 and a detection result control area 3004. The testing area can be a polyester fiber film, and the sample adding area can be glass fiber.

Gas Communication or Liquid Communication

Gas communication or liquid communication means that liquid or a gas can flow from one place to another, and may pass through some physical structures as a guiding role in the process of flow. "Passing through physical structures" generally means that the liquid flows passively or actively to another place through the surface of the physical structures, or spaces inside the structures. Passive flow generally refers to flow caused by an external force, for example flow under capillary action. The flow may also be the flow of the liquid or the gas due to its own action (gravity or pressure), or may be a passive flow. The communication herein does not mean that the liquid or gas is necessarily present, but merely indicates a connection relationship or state between two objects in some cases. If liquid is present, and may flow from one object to another, in the case, the communication means a state in which the two objects are connected, conversely, if there is no liquid communication or gas communication between the two objects, and if the liquid is in or on one object, and cannot flow into or on the other object, such a state is a non-communication, i.e. a non-liquid or gas communication state.

Detachable Combination

A detachable combination means that connection relationship between two parts is in several different states or position relationships. For example, in the case of two physically meaningful parts, the two parts can be separate at first, when in a suitable first case, the two parts are connected or combined together, when in a suitable second case, the two parts can be separated, the separation is spatially separated in the physical sense without contact. Or, the two parts are combined together at first, when in a suitable case, the two parts form a spatial separation in the physical sense. Or, the two parts are initially separated, combined together when needed to accomplish a certain function, and then separated again, or later combined together again for some purpose. In short, the combination of the two parts together or the separation between the two parts can be easily carried out, and the combination or the separation can be repeated in many cycles, or, of course, the combination or the separation can be a one-time combination or a one-time separation. In addition, the combination can be a detachable combination between two parts, and can also be a detachable combination between three or more than three parts. For example, in the case of first, second, and third parts, the first and second parts may be detachably combined, the second and third parts may also be detachably combined, and the first and third parts may also be detachably combined or separated. In addition, the combination mode can be that the two objects can be detached by themselves, and the two objects can be indirectly combined through an another object.

Testing Element

Testing elements refer to elements that can detect whether a specimen or sample contains analytes of interest based on any technical principles, for example, immunology, chemistry, electricity, optics, molecular science, nucleic acid, physics, etc. Lateral flow test strips can be selected as the testing elements, and can be used for detecting a plurality of analytes. Of course, other suitable testing elements may also be employed in the present invention, and various testing elements may be combined together in the present invention. One form of the testing elements is test strips. The test strips used for analyze analytes in a sample (e.g., drugs or metabolites indicating a physical condition) can be various in forms, such as immunoassay or chemical analysis forms. The test strips can be used in either a non-competitive method analysis mode or a competitive method analysis mode. The test strip generally contains an absorbent material with a sample adding area, a reagent area and a test area. The sample is added to the sample adding area and flows through the capillary action to the reagent area. In the reagent area, the sample is bound to a reagent if the analyte is present. The sample then continues to flow to a detection area. To other reagents, if molecules that bind specifically to the analyte, are immobilized in the detection area, the reagents react with the analyte (if present) in the sample and bind the analyte at the detection area, or bind to a certain reagent of the reagent area. Labels for displaying detection signals are present in a labeling area separated from the reagent area.

A typical non-competitive mode of analysis is that a signal is generated if the sample contains the analyte and no signal is generated if the analyte is not contained. In a competition method, a signal is generated if the analyte is not present in the sample, and no signal is generated if the analyte is present.

The testing element can be test paper with water-absorbing or non-water-absorbing materials selected. The test paper may include a variety of materials for liquid sample transfer. One of the materials of the test paper may cover another material, for example, filter paper covers a nitrocellulose membrane. One area of the test strip may be made of one or more materials, while another area may be made of one or more different materials. The test strip can be adhered to a support or a hard surface to improve the strength of holding the test strip.

The analyte is detected by means of a signal generating system, for example, a composition of one or more signal generating systems is immobilized in the detection region of the analyte of the testing paper by utilizing one or more enzymes specifically reacting with the analyte and by utilizing the method for immobilizing a specific binding substance on the test paper. A substance for generating signals can be arranged on the sample adding area, the reagent area, the detection area or the whole detection test paper, and one or more materials of the test paper can be filled with the substance. A solution containing the signal substance is added to the surface of the test paper or one or more materials of the test paper are submerged in the solution containing the signal substance, and then the test paper to which the solution containing the signal substance is added is dried.

Each area of the test paper can be arranged in the following ways: a sample adding area, a reagent area, a detection area, a control area, a sample adulteration determination area and a liquid sample absorption area. The control area is located behind the detection area. All areas can be arranged on a single strip of test paper with only one material, or different materials can be used in different areas.

Each area may be in direct contact with a liquid sample, or different areas may be arranged according to the flow direction of the liquid sample in the manner of connecting and overlapping of the end of each area with the front end of another area. The materials used can be well-water-absorbent materials such as filter paper, glass fiber or nitrocellulose membranes. Other forms of test paper can also be used.

A commonly used reagent strip is a nitrocellulose membrane reagent strip, that is, the detection area includes a nitrocellulose membrane, and specific binding molecules are fixed on the nitrocellulose membrane to display detection results; and the reagent strip can also be a cellulose acetate membrane or nylon membrane and the like. For example, the reagent strips or devices containing reagent strips are described in the following patents: U.S. Pat. Nos. 4,857,453, 5,073,484, 5,119,831, 5,185,127, 5,275,785, 5,416,000, 5,504,013, 5,602,040, 5,622,871, 5,654,162, 5,656,503, 5,686,315, 5,766,961, 5,770,460, 5,916,815, 5,976,895, 6,248,598, 6,140,136, 6,187,269, 6,187,598, 6,228,660, 6,235,241, 6,306,642, 6,352,862, 6,372,515, 6,379,620 and 6,403,383. The test strips and the similar devices with the test strips disclosed in the above patent documents can be applied to the testing element or the detection device of the present invention to detect the analyte, for example, the analyte in a sample.

The detection reagent strip applied to the present invention can be commonly referred to as the lateral flow test strip, and the specific structure and detection principle of the detection reagent strip are well known to those skilled in the art in the prior art. A common detection reagent strip comprises a sample collection area or a sample adding area, a marking area, a detection area and a water absorption area, the sample collection area comprises a sample receiving pad, the marking area comprises a marking pad, the water absorption area can comprise a water absorption pad, and the detection area comprises a necessary chemical substance capable of detecting whether an analyte is contained or not, such as an immunological reagent or an enzyme chemical reagent. The commonly used detection reagent strip is a nitrocellulose membrane reagent strip, that is, the detection area includes the nitrocellulose membrane, and the specific binding molecules are fixed on the nitrocellulose membrane to display the detection results; and the reagent strip can also be the cellulose acetate membrane or nylon membrane and the like. Of course, a detection result control area may be included downstream of the detection area. Generally, the detection results appear in the control area and the detection area in the form of transverse lines, namely detection lines or control lines. Such detection reagent strips are conventional reagent strips, and of course, other types of reagent strips that utilize capillary action for detection can also be used. In addition, the general detection reagent strip carries dry chemical reagent components, such as fixed antibodies or other reagents. When encountering liquid, the liquid flows along the reagent strip with capillary action, and with the flow, the dry reagent components are dissolved in the liquid, so that the dry reagent is treated and reacts in a next area, thus carrying out necessary detection. Liquid flow is mainly carried out by capillary action. All detection reagent strips can be used herein in the detection device of the present invention, either the detection reagent strip is in contact with a liquid sample in a detection chamber or used for detecting the presence or the quantity of the analyte in the liquid sample entering the detection chamber. The testing element is generally disposed in a test chamber 102, and when the liquid sample is in the test chamber, the liquid sample is in contact with the testing element, and is tested or detected.

Except that the above-mentioned test strip or the lateral flow test strip itself is used to contact the liquid sample to test whether the liquid sample contains the analyte. In some preferred embodiments, the testing elements may also be provided on some carriers, as shown in the FIG. 1. For example, on some carriers 103, a number of recesses 1031, 1032, 1033, 1034 are arranged, and the testing elements are located in the recesses. The carrier is inserted into the detection chamber to detect or test the analyte. The carrier is provided with a recess region and an expansion region 1034. The expansion region is shaped to match the opening of the detection chamber 1021, so that when the carrier is inserted into the detection chamber 1021, the expansion region 1034 of the carrier is located over an opening 1026 of the detection chamber to allow the carrier to be suspended in the detection chamber. Generally, the sample adding area of the testing element 300 is located away from the extended area to allow the sample adding area of the testing element to be near the bottom of the detection chamber, near a solution inlet, when the carrier is inserted into the detection chamber 1021 (e.g., FIG. 5A).

Analyte

Examples that can use the analyte in the present invention include some small molecule substances, including drugs (e.g., drug of abuse). "Drug of abuse" (DOA) refers to the use of drugs (typically acting to paralyze nerves) at non-medical destinations. Abuse of these drugs can lead to physical and mental impairment, dependence, addiction, and/or death. Examples of drug abuse include cocaine; amphetamine AMP (e.g., Black Beauty, White Amphetamine Tablets, Dexamphetamine, Dexamphetamine Tablets and Beans); methamphetamine MET (crank, methamphetamine, crystal and speed); barbiturate BAR (such as Valium, Roche Pharmaceuticals, Nutley and New Jersey); sedatives (i.e., sleep aid medications); lysergic acid diethylamine (LSD); inhibitors (downers, goofballs, barbs, blue solvents, yellow jackets and methaqualone); tricyclic antidepressants (TCAs, i.e. Imipramine, amitriptyline and doxepin); dimethylenedioxymethylaniline, MDMA; phencyclidine (PCP); tetrahydrocannabinol (THC, pot, dope, hash, weed, etc.).); opiates (i.e., morphine MOP or, opium, cocaine COC, heroin, and hydroxydihydrocodeinone); and anxiolytic drugs. The anxiolytic drugs are drugs which are mainly used for relieving anxiety, tension and fear and stabilizing mood and have hypnosis and sedation effects. The anxiolytic drugs comprise benzodiazepines BZO (benzodiazepines), atypical BZ, fused dinitrogen NB23C, benzazepines, ligands of BZ receptors, open-ring BZ, diphenylmethane derivatives, piperazine carboxylates, piperidine carboxylates, quinazolinones, thiazine and thiazole derivatives, other heterocycles, imidazole-type sedative/analgesic drugs (e.g., Oxycodone OXY and Methadone MTD), propylene glycol derivatives-carbamates, aliphatic compounds, anthracene derivatives, and the like. The detection device of the invention can also be used for detecting of use of drugs which belong to the medical use but is easy to overdose, such as tricyclic antidepressants (imipramine or analogues), acetaminophen and the like. The drugs are metabolized into small molecular substances after being absorbed by a human body, the small molecular substances exist in blood, urine, saliva, sweat and other body fluids, or the small molecular substances exist in part of the body fluids.

For example, analytes detected by the detection device of the invention include, but are not limited to, creatinine, bilirubin, nitrites, proteins (non-specific), hormones (e.g., human villus-promoting hormone, progesterone hormone, follicle-stimulating hormone, etc.), blood, leukocytes, sugars, heavy metals, or toxins, bacterial substances (such as protein or carbohydrate substances directed against specific bacteria such as *Escherichia coli* 0157: H7, *Staphylococcus, Salmonella, Clostridium, Campylobacter, L. monocytogenes, Vibrio,* or *Bacillus cereus*) and substances associated with physiological characteristics, such as pH and specific gravity in urine samples. Any other clinical urine chemical analysis can be detected by utilizing a lateral cross-flow detection form in cooperation with the device disclosed by the invention.

Flow of Liquid

The flow of liquid generally refers to the flow from one place to another, and in general, the flow of liquid in nature flows from a high place to a low place mostly under the action of gravity, and the flow here also relies on external forces, i.e., the flow under the condition of external gravity, and can become the flow under natural gravity. In addition to gravity, the flow of the liquid may also overcome gravity for movement from low to high. For example, under extraction, compression or pressure, the liquid flows from bottom to high, or due to the pressure, the liquid overcomes the gravity of the liquid to flow.

Detection Device

Figure 5A:
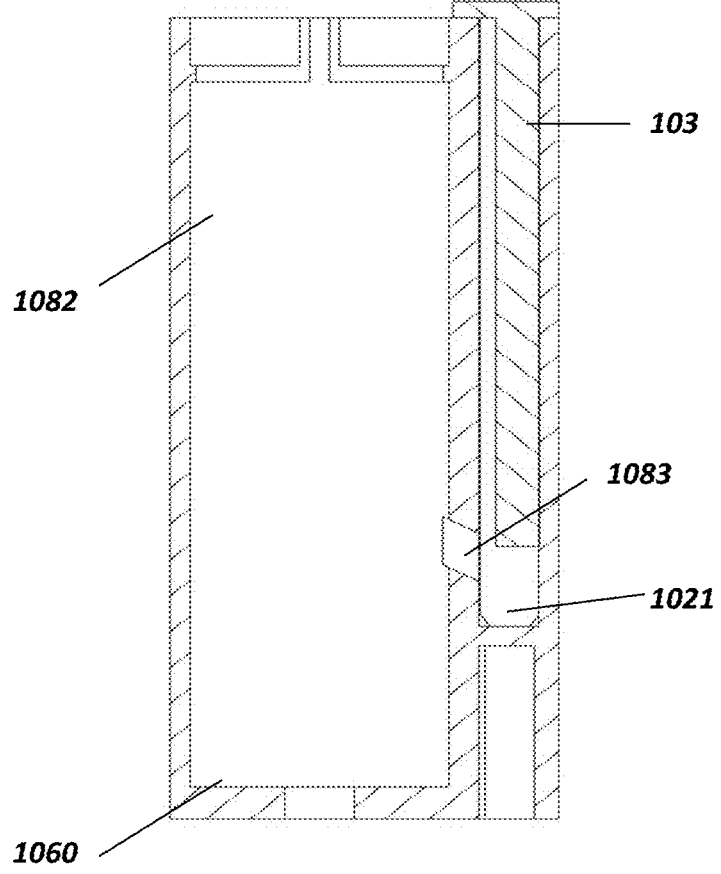
FIG. 5A is a cross-sectional structural diagram of a detection chamber and an accommodating chamber in a specific embodiment of the present invention.
Figure 5B:
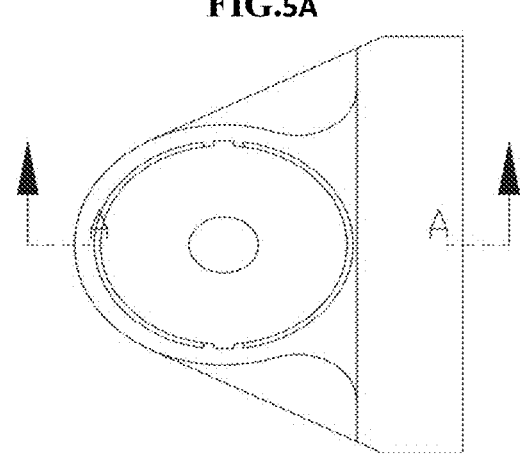
FIG. 5B is a schematic perspective view of the detection chamber and the accommodating chamber.

A detection device refers to a device for detecting whether an analyte is contained in a sample. The detection device of the present invention can simply comprise a detection chamber and a testing element arranged in the detection chamber, so that the detection device can be called as the detection device. For example, the detection device comprises the detection chamber 1021 in which the testing element or the testing element containing the carrier 103 is contained. In some embodiments, the detection chamber is provided with a solution inlet 1083, the liquid sample flows through the solution inlet into the detection chamber and comes into contact with the testing element. In some embodiments, the sample adding region of the testing element is proximate to the solution inlet 1083, and liquid flows from the inlet 1083 into the detection chamber, and can be contacted by the sample adding region, so that the liquid sample flows along the sample adding region to the detection region for assaying and detecting of the analyte. As shown in FIG. 5A, the solution inlet 1083 is arranged near the bottom of the detection chamber 1201. The detection chamber 1021 is generally provided with a chamber 102. In some embodiments, and the detection device further comprises an accommodating chamber 108 configured as a chamber space for receiving a receiving chamber 105. The accommodating chamber is communicated with the detection chamber through the solution inlet. In some embodiments, the accommodating chamber is located on one side of the detection chamber and is generally cylindrical in shape.

Receiving Chamber and Detection Chamber

In some preferred embodiments, the present invention also provides the receiving chamber, the receiving chamber and the detection chamber can be movable relative to each other. On one hand, the receiving chamber receives the absorption element, so that a sample on the absorption element is released into the receiving chamber, and on the other hand, the liquid sample is transferred into the detection chamber through movement of the receiving chamber, and therefore testing and detection are completed. When the absorption element is inserted into the receiving chamber, after the liquid sample is released into the receiving chamber or the sample on the absorption element is subjected to a previous treatment step or a treatment process before formal detection, so that the absorption element can release the sample or adsorbed analytes on the absorption element as much as possible, or after the liquid samples are processed, the properties of some liquid samples are changed, so that the detection efficiency or accuracy is improved.

A detection device of an embodiment is shown in FIGS. 1-9, and the device comprises a detection chamber 1021 and a receiving chamber 105. In one embodiment, the receiving chamber is a chamber structure 105, and the chamber structure may be in the form of a cuvette or tube, and is provided with the receiving chamber 105. The receiving chamber comprises the chamber 105 with an opening 1059 at one end and the other end closed. When the absorbent element absorbs a liquid sample, the absorbent element may be inserted into the chamber 105, thereby releasing the liquid sample into the receiving chamber. In some embodiments, a raised structure 1061 is included at the bottom of the receiving chamber, the raised structure is raised in the center of the bottom and forms an annular groove 1062, 1063 with the side wall of the receiving chamber. A solution outlet 1051 is formed in the receiving chamber, and the solution outlet is used for allowing the liquid sample in the receiving chamber to flow into the detection chamber at a proper position.

In some embodiments, an additional mixed solution is desirable to elute the absorbent element or to perform a pre-detection treatment process on the liquid sample, so that the mixed solution is provided, the mixed solution can contain some chemical or biological reagents, and the liquid solution is used to treat the fluid sample or the absorbent element. The mixed solution here generally does not contain an analyte of interest. In some embodiments, the receiving chamber contains a mixed solution that is either pre-stored directly inside the receiving chamber 105 or pre-canned in the receiving chamber 105 as shown in FIG. 1, and the receiving chamber is sealed by a plug 101 prior to detection. In this way, the mixed solution is located in the receiving chamber, generally at the bottom of the receiving chamber. When detection is required, a cap or the plug 101 is removed, the absorbent element 108 is inserted into the receiving chamber, and the absorbent element is brought into contact with the mixed solution for elution, mixing, or pretreatment of the fluid sample, etc. The plug 101 here may be any other form of sealing structure, such as a lid, a sealing film, a sealing cap, or the like. When the sealing film is used, the sealing film may be punctured with a puncture structure or the absorption element may be provided with a puncture structure to puncture the sealing film and enter the receiving chamber 105.

Figure 10:
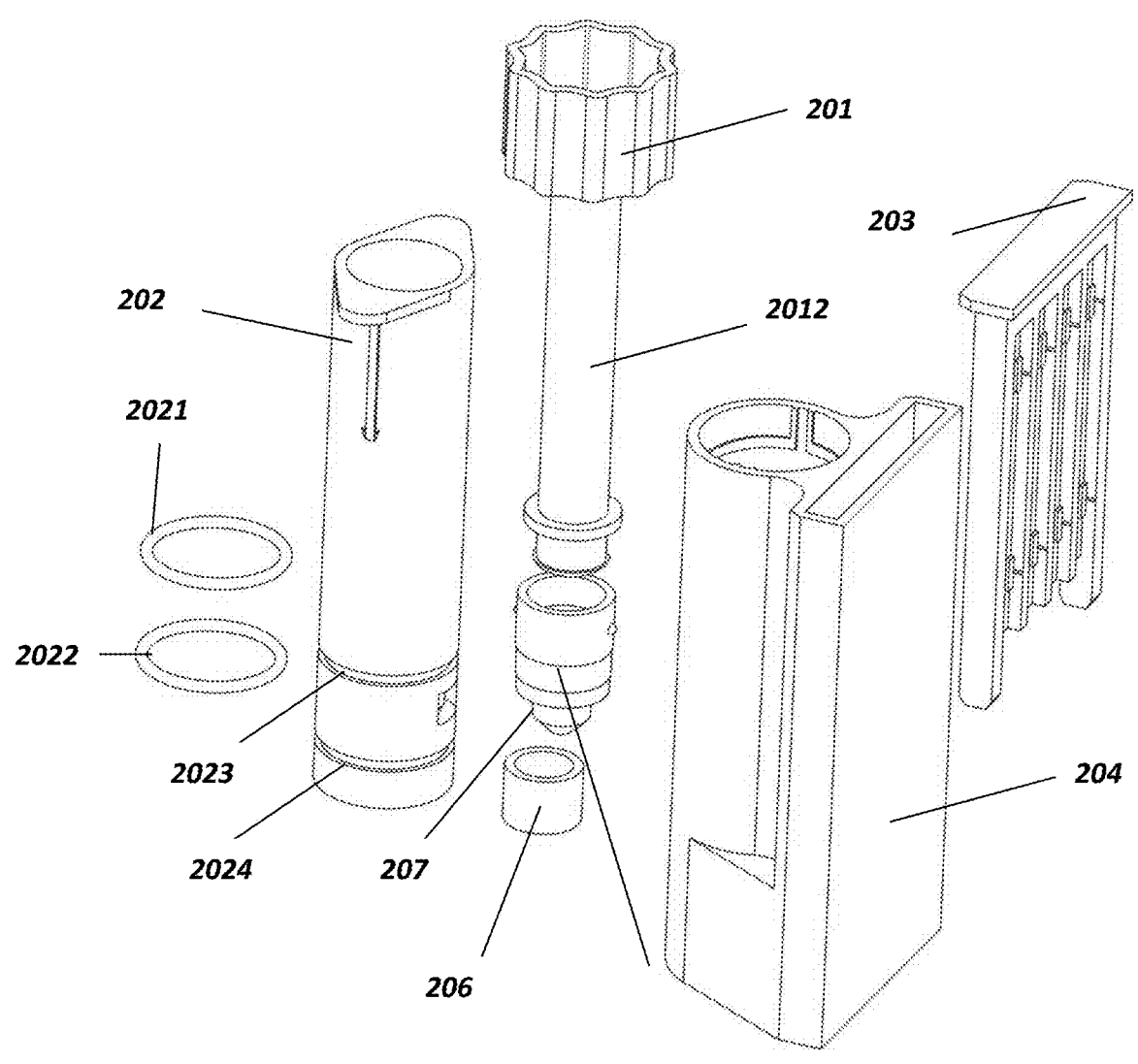
FIG. 10 is a perspective view showing an overall structure of another embodiment of the present invention.
Figure 14:
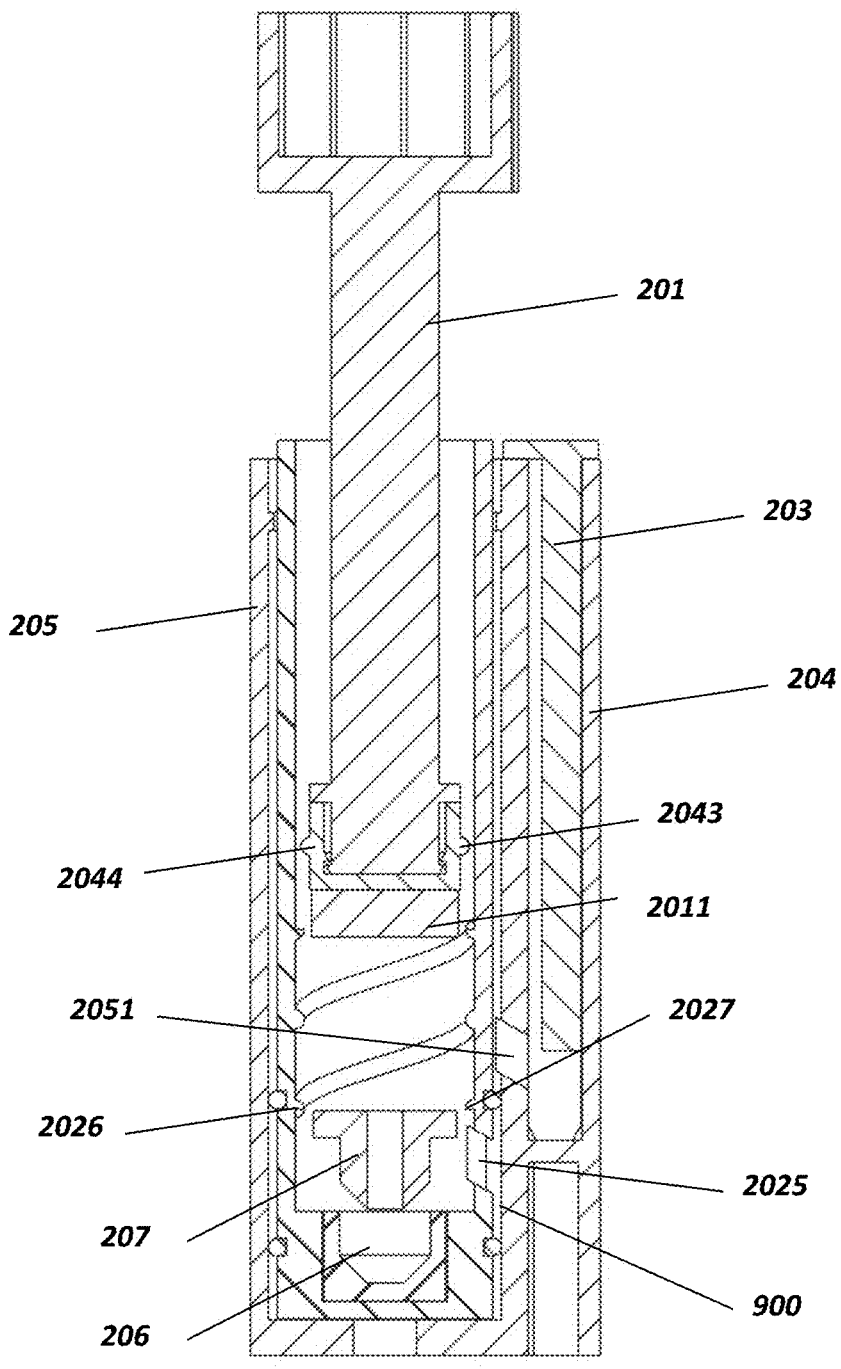
FIG. 14 shows that the receiving chamber receives the insertion of the collector, at the moment, the receiving chamber is located at the first position, the solution outlet is located below the solution inlet, the liquid located in the receiving chamber cannot flow into the detection chamber, the chamber for sealing the treatment liquid is located at the bottom of the receiving chamber, and a puncture element is arranged on the chamber.

In other embodiments, as shown in FIGS. 10 and 14, the mixed solution is sealed in a small bottle or container. The mixed solution is sealed in a container 206 which is sealed with a puncture-prone film such as aluminum foil or any other form of film. The container is located inside the receiving chamber, generally at the bottom of the receiving chamber. In some embodiments, if the absorbent element is provided with a puncture structure, when the absorbent element is inserted into the receiving chamber, the puncture element punctures the sealing film and releases a mixed solution, and the mixed solution contacts the absorbent element. In other embodiments, the puncture element 207 is also located in the receiving chamber above the sealed container as shown in FIG. 14. When the absorbent element 2011 is inserted into the receiving chamber, and is compressed along with the receiving element, thereby pushing the puncture element 207 to puncture the sealed container, the punctured sealed container release treatment liquid, and the treatment liquid treatment liquid comes into contact with the absorbent element 207 or is mixed or contacted with the liquid sample released from the absorbent element.

Figure 6:
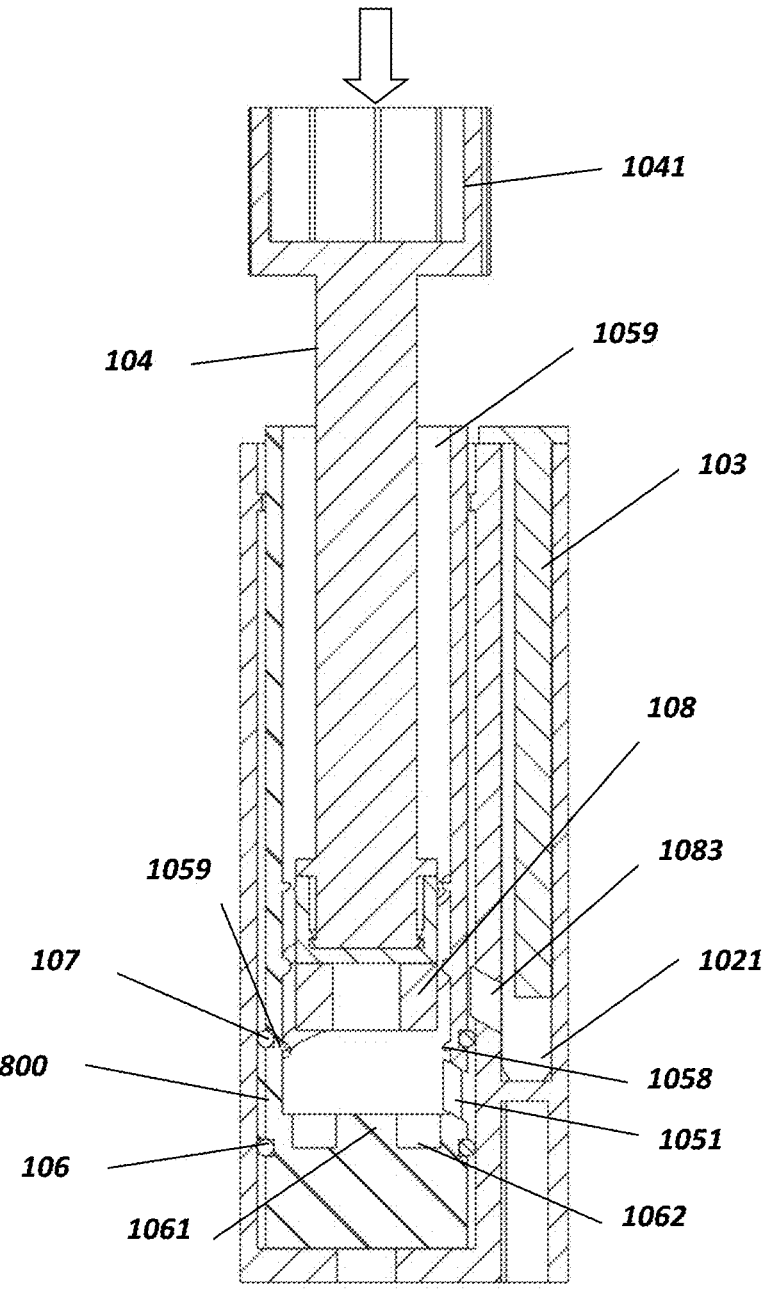
FIG. 6 shows that the receiving chamber receives the insertion of the collector, at the moment, the receiving chamber is in the first position, the solution outlet is located below the solution inlet, liquid in the receiving chamber cannot flow into the detection chamber.
Figure 15:
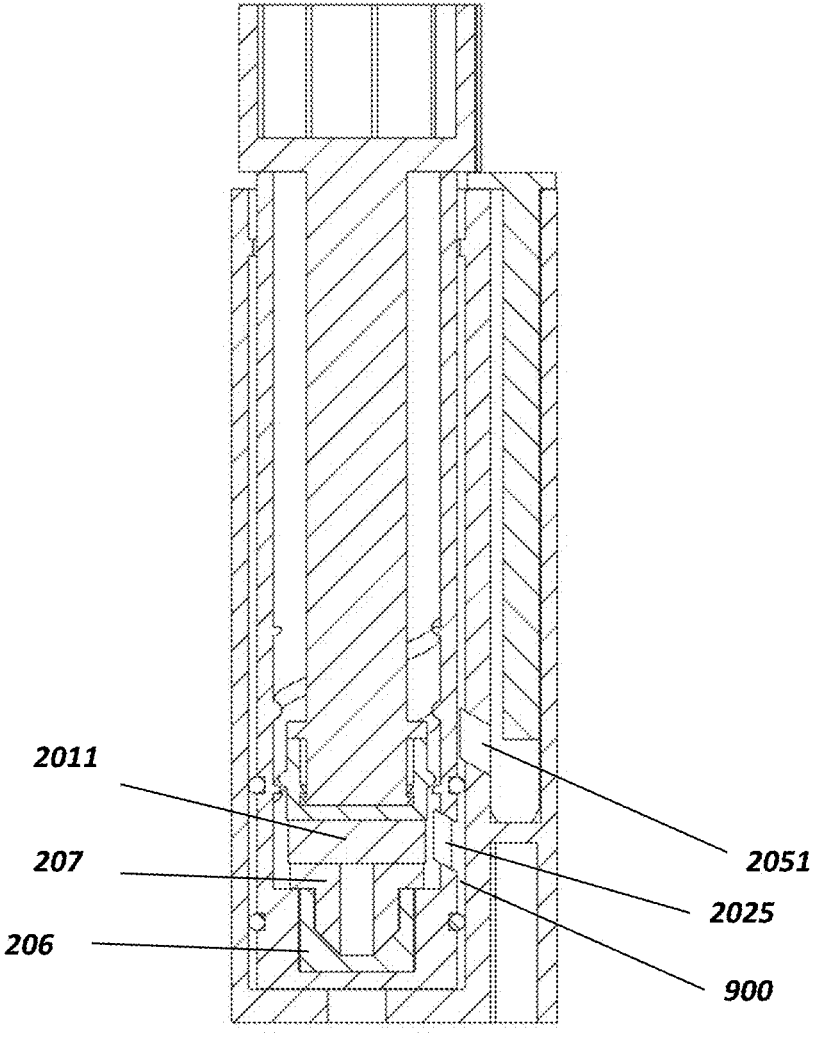
FIG. 15 shows that after the collector is inserted into the receiving chamber, the collector and the receiving chamber are locked together and connected together, and the receiving chamber is in the first position, and when the solution outlet is located below the solution inlet, the liquid in the receiving chamber cannot flow into the detection chamber, the collector pushes the piercing element to pierce the chamber sealing the treatment liquid, so that the released treatment liquid is in contact with the absorbent element or is mixed with the liquid sample released from the absorbent element.
Figure 16:
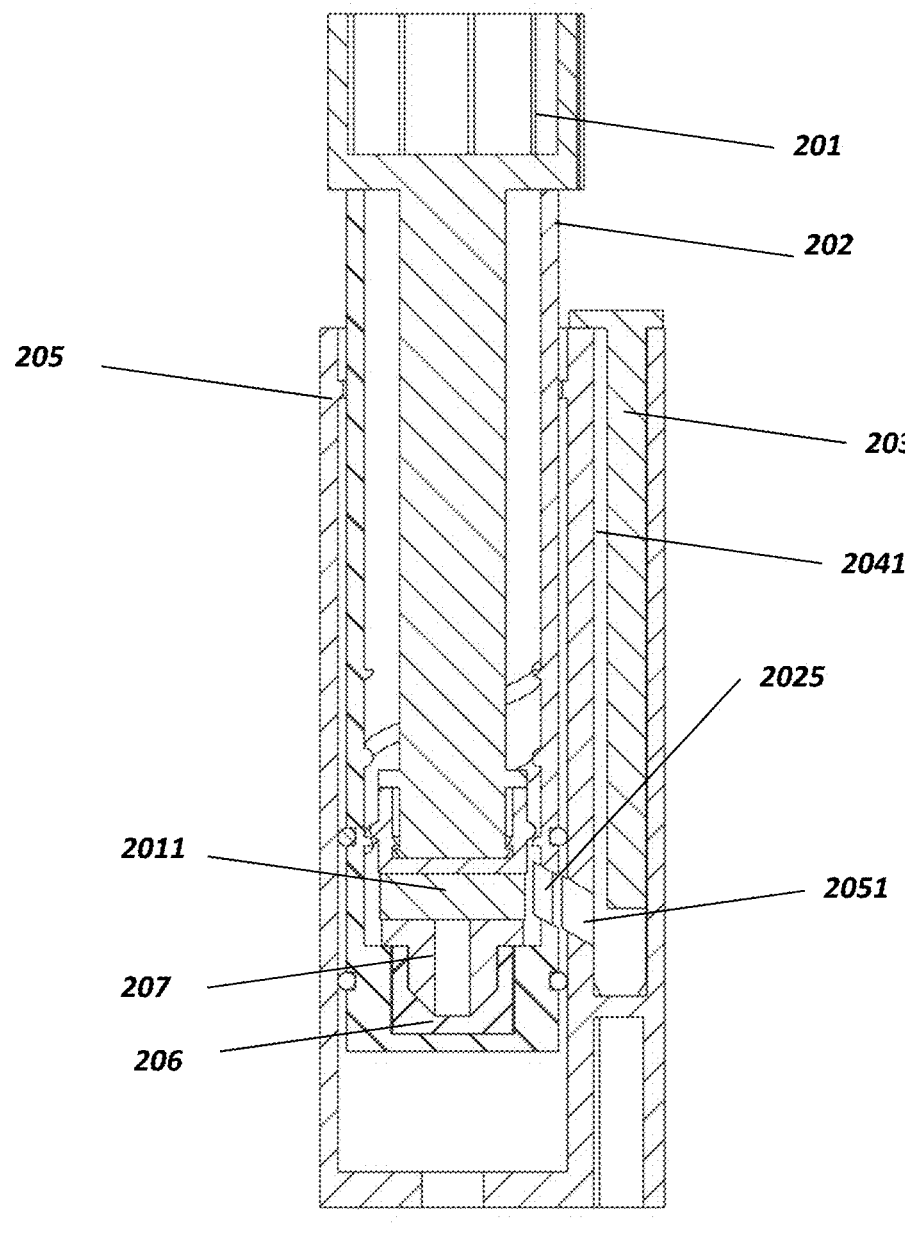
FIG. 16 shows that after the collector and the receiving chamber are locked together and connected into an integrated structure, the receiving chamber and the collector are driven to move together in the accommodating chamber from bottom to top to the second position, at the moment, the solution outlet and the solution inlet are aligned in position, and the liquid in the receiving chamber flows into the detection chamber. After the receiving chamber and the collector move to the second position, due to the fact that the outer wall of the receiving chamber and the inner wall of the accommodating chamber are provided with a locking and limiting structure, the receiving chamber cannot move any more and stays at the second position.
Figure 17:
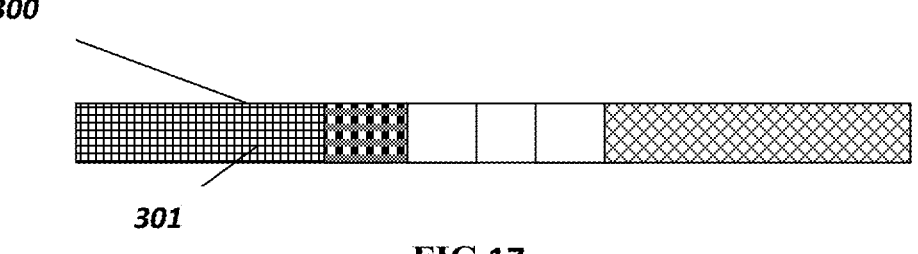
FIG. 17 is a schematic diagram of the structure of a testing element.

When the mixed solution is contained, the absorption element is in contact with the mixed solution, or the liquid sample released from the absorption element is mixed or contacted with the mixed solution, the mixed solution is stored in the receiving chamber, and when the receiving chamber and the detection chamber are not in fluid communication, no liquid enters the detection chamber, and no reaction is carried out in advance. For example, as shown in FIGS. 6 and 15, at this time, the solution outlet 1051 of the receiving chamber is located below the solution inlet 1083, and at this time, the receiving chamber is in the first position, since the solution outlet 1051 is not aligned with the solution inlet 1083, the liquid located in the receiving chamber may not flow into the detection chamber for testing.

After waiting for a period of time, and when appropriate, the receiving chamber and the detection chamber can be in fluid communication for testing and detection. In order to insert the absorbent element into the receiving chamber and to make the absorbent element in a compressed state, a buckle form can be provided in the absorbent element and a corresponding buckle form can be provided in the receiving chamber. In this way, the absorbent element is inserted into the receiving chamber in the form of a snap, so that the absorbent element is fixed in the receiving chamber, and it is usually desirable to be fixed during compression or after compression. In this way, the collector and the receiving chamber are locked together to form an integrated structure, which is convenient for moving together during subsequent movement. For example, the end of the collector is provided with the absorbent element 108, two protrusions 1043 and 1044 are arranged on the end, which collides with the two protrusions 1059 and 1058 at the bottom of the receiving chamber 105, so that the two protrusions 1043 on the collector is located below the soil 1059 in the receiving chamber, and the other protrusion 1044 at the end is located below the other protrusion 1058 at the bottom of the receiving chamber. In this position, the absorbent element 108 is compressed, but is always in a compressed state. In addition, the collector and the receiving chamber are in a locked position and connected into an integrated structure. If the collector needs to be pulled upward, the receiving chamber may also be moved upward together. The way is only a way to realize the structure for locking the collector and the receiving chamber, and any structure for locking the collector in the receiving chamber and integrating the collector with the receiving chamber can be used in the device of the present invention.

Figure 7:
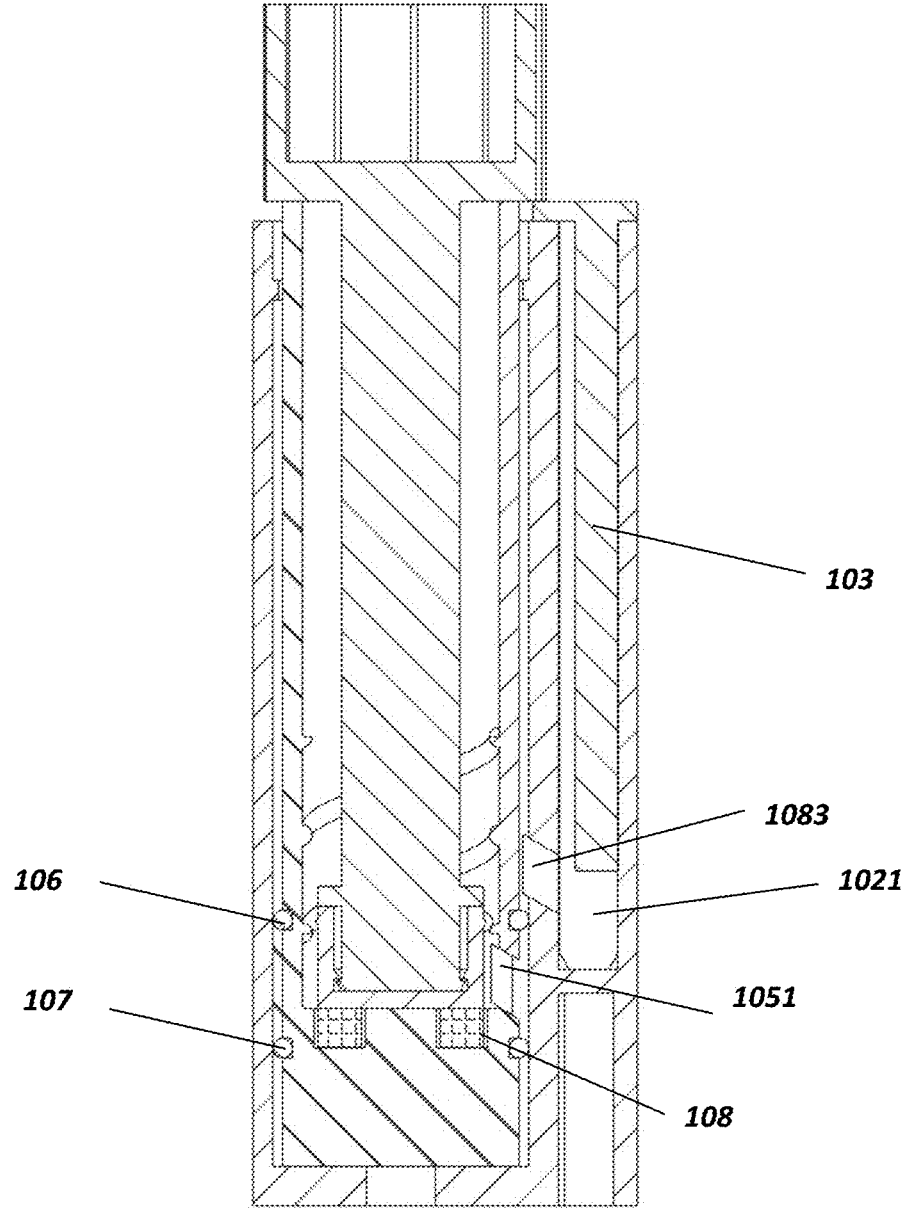
FIG. 7 shows that the receiving chamber receives the insertion of the collector. An absorbent element is compressed at the bottom of the receiving chamber to release a liquid sample. At this time, the collector and the receiving chamber are locked together. At this time, the receiving chamber is in the first position. At this time, the solution outlet is located below the solution inlet, and the liquid in the receiving chamber cannot flow into the detection chamber.
Figure 8:
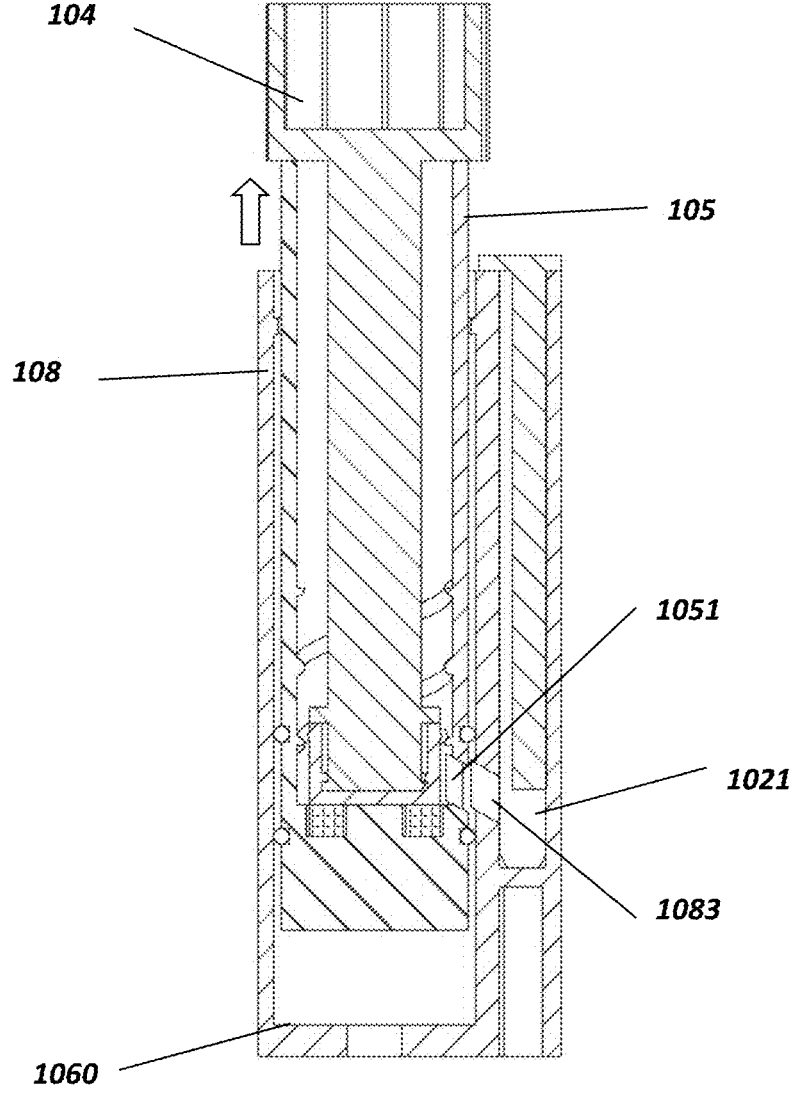
FIG. 8 shows that after the collector is locked with the receiving chamber, the receiving chamber and the collector are driven to move upward in the accommodating chamber and move to the second position. At this time, the solution outlet on the receiving chamber is aligned and communicated with the solution inlet of the detection chamber, and the solution in the receiving chamber flows into the detection chamber and contacts with the testing element in the detection chamber to complete testing of the sample.

In some embodiments, the receiving chamber is provided with the first position and the second position, when in the first position, the fluid does not flow into the detection chamber, when in the second position, the fluid located in the receiving chamber flows into the detection chamber to contact the test element. In some embodiments, when in the first position, the receiving chamber is provided with a solution outlet 1051, the detection chamber is provided with a solution inlet 1083. The solution inlet or the solution outlet herein may be of any other form, for example in the form of a channel, a hole or the like. If not in communication, the outlet 1051 and the inlet 1083 are not in communication or not aligned, no flow of liquid may occur. In particular, in some embodiments, for example as shown in FIG. 6, the solution outlet 1051 is positioned vertically below the inlet 1083, so that when the absorbent element is inserted into the receiving chamber to release the liquid sample, the liquid in the receiving chamber does not flow to the inlet 1083, and detection does not occur (FIG. 7). When the detection is carried out, the receiving chamber moves upwards to the position of the inlet 1083, at the moment, the solution outlet 1051 of the receiving chamber is aligned with the position of the solution inlet 1083, and liquid in the receiving chamber can flow into the detection chamber to be detected. Of course, it is also possible that the solution outlet 1051 is located above the inlet 1083 in a vertical position, so that the liquid in the receiving chamber does not flow to the inlet when the absorbent element is inserted into the receiving chamber to release the liquid sample. When the detection is carried out, the receiving chamber is made to move downwards to the position of the inlet 1083, the solution outlet is aligned with the solution inlet, and at the moment, the liquid in the receiving chamber flows into the detection chamber to be detected. The manner in which the outlet 402 and the inlet 304 are aligned may be determined by the distance for which the receiving chamber is moved, for example, the distance between the inlet and the outlet is designed according to the distance or the length of the path for which the chamber is moved from the first position to the second position, or to the distance for which the receiving chamber is moved is set according to the distance between the inlet and the outlet. It can be easily known that whether the liquid is in fluid communication with the detection chamber or not can be controlled by movement of the receiving chamber, and the fluid communication state can also be controlled by moving the detection chamber relative to the receiving chamber through the movement mode of the detection chamber.

Accommodating Chamber and Receiving Chamber

Figure 3:
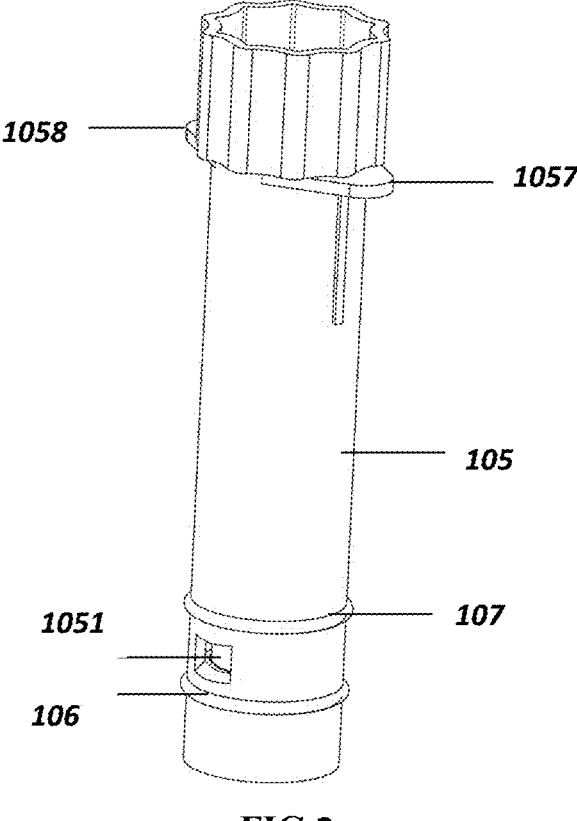
FIG. 3 is a structural schematic diagram of a collector inserted into a receiving chamber in a specific embodiment of the present invention.
Figure 4:
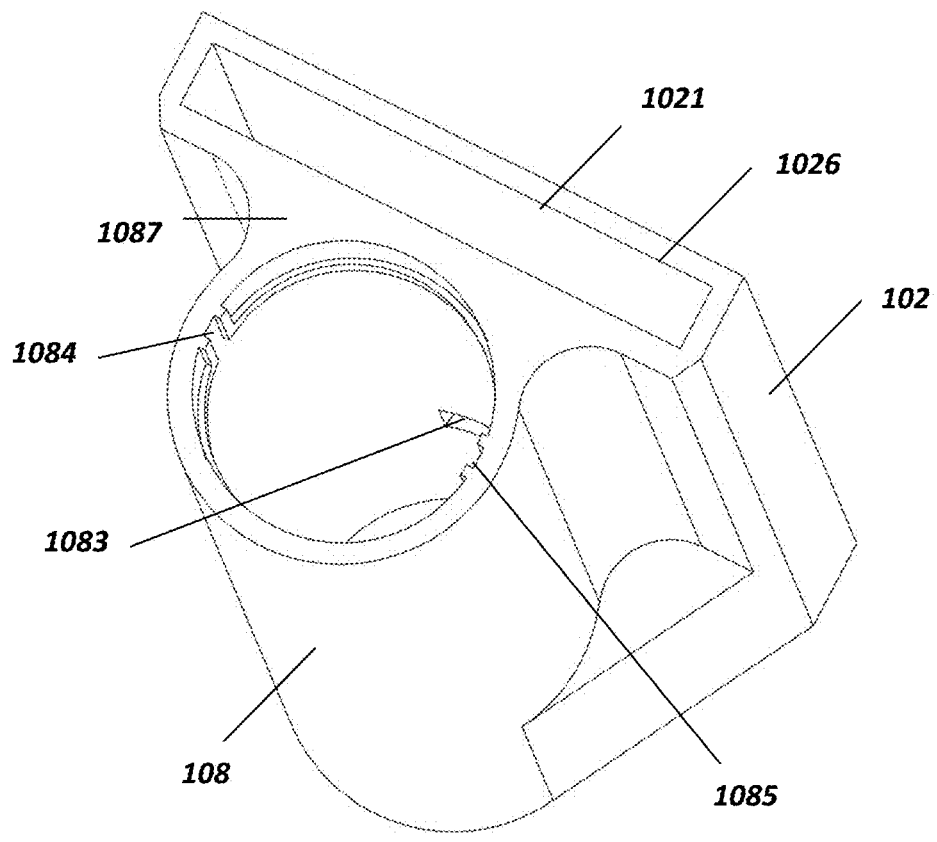
FIG. 4 is a structural schematic diagram of a detection chamber and an accommodating chamber in a specific embodiment of the present invention.

In a specific embodiment, the detection device comprises an accommodating chamber 108, the receiving chamber 105 is located in the accommodating chamber 108, and the accommodating chamber 108 is configured to move the receiving chamber 105 in the accommodating chamber 108. The movement is also relative to the detection chamber, and when the accommodating chamber 108 and the detection chamber are of an integrated structure, for example, as shown in FIGS. 1 and 4, the accommodating chamber is provided with an opening 1082, the accommodating chamber 108 and the detection chamber 102 are connected into an integral structure, the solution inlet 1083 is formed in a side wall 1087, shared with the detection chamber, in the accommodating chamber 108, and the accommodating chamber and the detection chamber penetrate through or are communicated through the solution inlet. Two sealing rings are arranged at the positions, close to the bottom, of the receiving chamber and arranged on the two sides of the solution outlet 1051 respectively, for example as shown in FIGS. 1 and 3, a sealing ring 107 is arranged above the solution outlet 1051 of the receiving chamber, and a sealing ring 106 is arranged below the solution outlet 1051 of the receiving chamber 105. The sealing rings are generally disposed within grooves 1056 and 1055 in the outer wall of the receiving chamber. The groove is an outer wall surrounding the entire receiving chamber. When the receiving chamber is inserted into the accommodating chamber, the sealing rings 107 and 106 located on the outer wall of the receiving chamber are tightly attached to the inner wall of the accommodating chamber to form a sealed space. Therefore, even if redundant liquid exists in the receiving chamber, the liquid cannot flow into the accommodating chamber through the solution outlet due to the fact that the sealing rings actually forms the sealed space 800 located between the outer wall of the receiving chamber and the inner wall of the accommodating chamber, and the space is relatively narrow, so that if excess liquid exists in the receiving chamber, the excess liquid can only flow into the sealed space 800 from the solution outlet 1051. In order to enable the space to be as small as possible, generally, the distance between the outer wall of the receiving chamber and the inner wall of the accommodating chamber is only the thickness of the sealing ring and is about 1-2 mm. Therefore, the volume of the whole sealed space is very small, and even if the liquid flows out of the receiving chamber, the liquid flowing into the sealed space is reduced as much as possible. It is appreciated that in the most preferred embodiment, the level of the liquid sample in the receiving chamber is generally always higher than the level of the solution outlet, so that when the solution outlet 1051 is aligned with the solution inlet 1083, a smooth flow of the liquid into the detection chamber can be achieved. In order for the liquid level to be higher than the level of the solution outlet 1051, the outer diameter of the absorbent element 108 on the collector 104 is comparable to the inner diameter of the receiving chamber, so that the released liquid is generally released above the end of the collector even if the absorbent element 108 is squeezed or compressed at the bottom of the receiving chamber. If the treatment liquid is stored in the receiving chamber in advance and the amount of the whole liquid (treatment liquid+liquid sample) is sufficient, even if part of the liquid fills the sealed space 800, the liquid level can be higher than the solution outlet 1051. In order to enable the liquid to flow into the detection chamber more smoothly, a certain gap is reserved when the cover body 1041 of the collector is in contact with the opening of the receiving chamber, so that the inside of the receiving chamber keeps flowing with the outside atmosphere, and therefore, the liquid can flow into the detection chamber more smoothly, or in another embodiment, a through hole is formed near the opening 1021 of the detection chamber, communication with the outside is protected, so that the liquid can smoothly enter the bottom of the detection chamber.

Thus as described above the collector 104 is inserted into the receiving chamber into a locked position with the receiving chamber. In this way, the collector is driven out of the opening of the accommodating chamber 108, that is to say, the receiving chamber is exposed from the opening 1082 of the accommodating chamber and moves, the receiving chamber moves together with the collector from the first position, with the solution outlet 1051 located below the solution inlet 1083, to a position aligned with the solution inlet, and moves upward from the first position. Once the receiving chamber moves to the aligned position, the receiving chamber can no longer move upward, but stays in the contrast position. In order to prevent the receiving chamber from continuing to move upwards and to prevent the receiving chamber from rotating when moving, some control structures are arranged on the receiving chamber and the accommodating chamber to avoid such an event. This is because if the receiving chamber 105 is rotated the solution outlet 1051 is not in aligned communication with the solution inlet 1083 in the longitudinal position. Therefore, a slide rail or a pair of slide rails is or are provided on the outer wall of the receiving chamber, and slide grooves 1084 and 1085 are provided on the inner wall of the accommodating chamber, so that rotation does not occur when the receiving chamber moves up and down the axis. In addition, a barb structure 2027 is provided on the slide rail, and a structure matched with the barb is arranged in the accommodating chamber, for example, a protrusion mated with the barb, the protrusion is provided on the inner wall of the accommodating chamber, and the barb structure 2027 contacts the protrusion of the accommodating chamber when the receiving chamber is pulled upward from the bottom of the accommodating chamber together with the collector, and when the solution outlet 1051 and the solution inlet 1083 are aligned in position, the barb structure 2027 is in contact with the protrusion of the accommodating chamber, so that further upward movement of the receiving chamber is limited. Whether or not the receiving chamber 105 is automatically moved downwards is generally unlikely because an elastic sealing ring on the outer wall of the receiving chamber is arranged, it is sufficient to overcome the gravity of the receiving chamber and the collecting chamber by virtue of the friction force between the sealing ring and the inner wall of the accommodating chamber. Once the liquid enters the detection chamber and is in contact with the test strip, and detection is completed, the receiving chamber can be moved from the second position to the first position, so that the volume of the whole device is reduced, and subsequent transportation is facilitated, for example, the device can be used for confirmation and assay of professional experimental structures, and confirmation of preliminary immune detection by liquid phase, meteorology and mass spectrum.

The receiving chamber 105 is moved in the accommodating chamber 108 in the first position and in the second position. In some embodiments, the solution inlet 1051 is open on the receiving chamber and the solution outlet is open on the detection chamber. In some embodiments, one wall of the accommodating chamber 108 and the detection chamber share one wall 1087, and the solution inlet is formed in the shared wall 1087, as shown in FIG. 4. In some alternative embodiments, the receiving chamber is not configured to receive the absorbent element, but is configured to directly receive the liquid sample, and when the receiving chamber is configured to receive the liquid sample, the positional relationship between the receiving chamber and the detection chamber may be controlled to allow the liquid sample to flow from the receiving chamber to the detection chamber for reaction.

Figure 9:
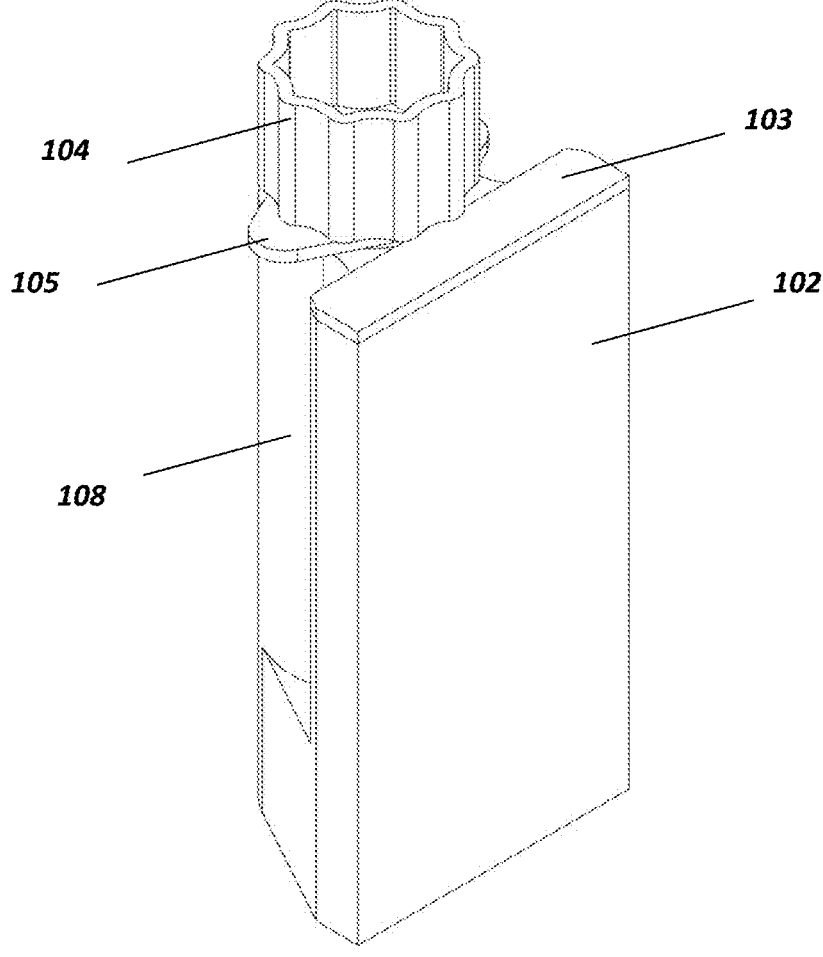
FIG. 9 is a schematic perspective view of the diagram shown in FIG. 7.

A specific description of two embodiments is made below. For example, as shown in FIGS. 1-9, a specific detection device is provided, the device comprises a detection chamber 102, in which a carrier 103 for fixing testing elements is provided, the carrier is provided with a plurality of recesses 1031, 1032, 1033, 1034, and one testing element is arranged in each recess. During assembly, the testing elements are fixed on the carrier, and then the carrier is inserted into the detection chamber 103, so that an expansion part 1035 of the carrier is matched with an opening 1026 of the detection chamber, the opening 1026 of the detection chamber can be sealed or not sealed, the carrier is suspended in the detection chamber, and at the moment, a sample adding area of the testing element is close to the bottom of the detection chamber, and is located at the solution inlet 1083 disposed near the bottom of the detection chamber. An accommodating chamber 108 is formed in one side of the detection chamber, sliding grooves are formed in the inner wall of the accommodating chamber, the pair of sliding grooves 1084 and 1085 are symmetrically formed, and the symmetrical sliding grooves are matched with sliding rails symmetrically formed in the receiving chamber 105, so that the position where the receiving chamber is inserted into the accommodating chamber is fixed (fixed in the vertical direction and cannot rotate). In this way, a solution outlet 1051 formed in the receiving chamber 105 and a solution inlet 1083 formed in the side wall of the detection chamber are located on the same straight line. Although the solution outlet and the solution inlet are located on the same straight line, the positions are different and staggered. Meanwhile, a pair of elastic sealing rings are arranged on the outer wall of the receiving chamber and located on the upper side and the lower side of the solution outlet 1051 respectively, as shown in FIG. 3, in this way, when the receiving chamber 105 is inserted into the accommodating chamber 108, the bottom of the receiving chamber makes contact with the bottom 1086 of the accommodating chamber, a sealed space 800 is formed between the inner wall of the accommodating chamber and the outer wall of the receiving chamber, and the sealed space seals the solution outlet 1051. The solution outlet at this point is located below the solution inlet (as shown in FIG. 6). A collector 104 is provided. The collector is provided at one end with an end portion on which an absorbent element 108 is provided. The other end is provided with a cap-like structure 1041, and the end portion is connected to the cap through a rod 1042. Two protrusions 1044 and 1043 are provided on the end portion, and can be meshed with two protrusions 1059 and 1058 provided in the receiving chamber. A sealing plug 101 is also provided, and treatment liquid is in the receiving chamber, so that the treatment liquid in the receiving chamber is sealed by the sealing plug 101. A plurality of raised structures 1057 and 1058, like ear structures, are provided near the opening of the receiving chamber 105. The final assembled device is shown in FIG. 6. In performing a test, a liquid sample, such as a saliva sample, is first absorbed by the absorbent element 108 of the collector, and then the absorbent element is inserted into the receiving chamber, and the absorbent element is in contact with a protrusion 1061 provided at the bottom of the receiving chamber, such that the absorbent element 108 is compressed to release the liquid sample. The liquid sample is mixed with the treatment liquid, the treatment liquid is in contact with the absorbent element, and during compression, two protrusions 1044 and 1043 on the collector engage with the protrusions 1059 and 1058 provided in the receiving chamber, thereby locking the collector and receiving chamber together, leaving the absorbent element 108 always in a compressed state (as shown in FIGS. 7 and 9). When an examination test is required, the ear structures 1057 and 1058 near the opening of the receiving chamber are held by hands, so that the receiving chamber and the collector leave the bottom 1060 of the accommodating chamber together, and move from a first position below to a second position until the receiving chamber cannot be pulled, and at this time, the solution outlet 1051 of the receiving chamber is aligned with or communicated with the solution inlet 1083 of the detection chamber, so that the liquid (the liquid sample or the mixed liquid of the liquid sample and the treatment liquid) in the receiving chamber flows into the detection chamber and contacts a test strip for testing. After the test is completed, if further confirmation is needed, the receiving chamber is pushed back to the initial position, and then the device is packed and transported to a professional laboratory.

Figure 11:
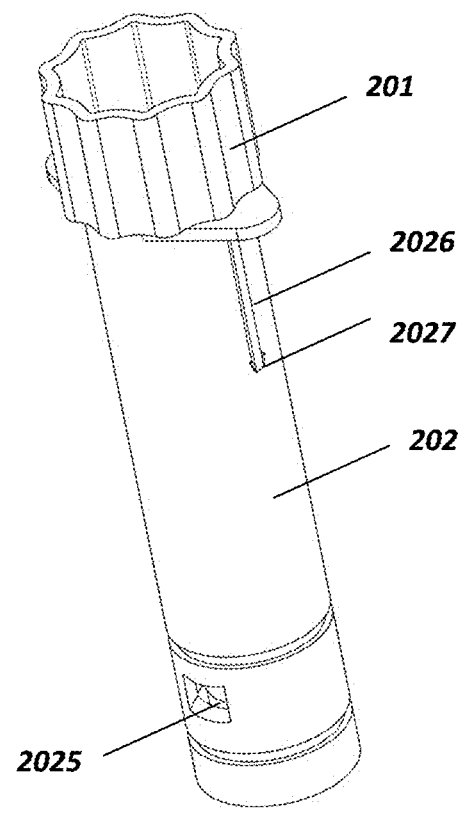
FIG. 11 is a perspective view of a collector inserted into a receiving chamber according to another embodiment of the present invention.
Figure 12:
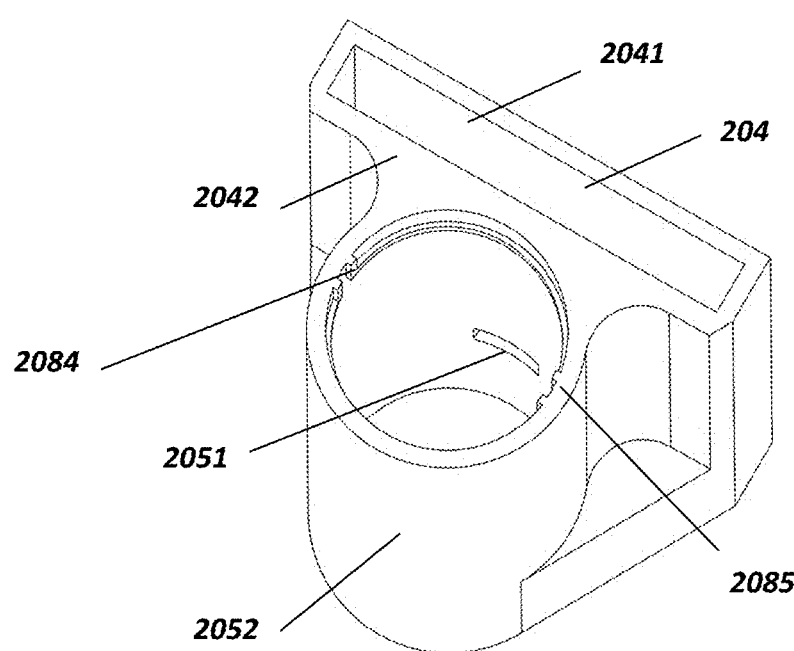
FIG. 12 is a perspective view of a containment chamber and a detection chamber in an embodiment of the present invention.
Figure 13:
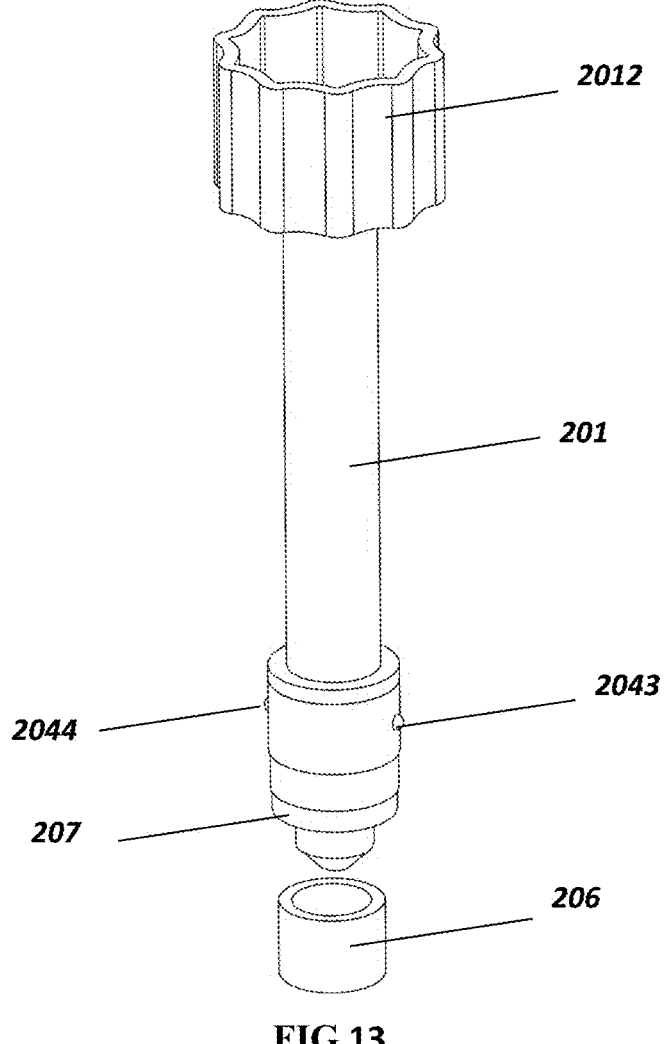
FIG. 13 is a schematic exploded view of a collector, a puncture element, and a chamber for sealing treatment liquid in an embodiment.

FIGS. 10-16 shows another detailed embodiment of the present invention; a specific detection device includes a detection chamber 204, in which a carrier 203 for fixing a testing element is provided, and a plurality of grooves are provided in the carrier, and a testing element is provided in each groove. When assembling, the testing element is fixed on the carrier firstly, and the carrier is then inserted into the detection chamber 204, so that the expansion part of the carrier engages with the opening 2041 of the detection chamber, which may or may not be sealed, thus the carrier is suspended in the detection chamber, and the sample application area of the testing element is close to the bottom of the evil chamber at the position of the solution inlet 2051 provided near the detection bottom. A receiving chamber 2052 is provided on the side of the detection, a chute is arranged on the inner wall of the containing chamber, a pair of chutes 2084 and 2085 are symmetrically arranged, and the symmetrical chutes cooperate with the slide rails symmetrically arranged on the receiving chamber 202, so that the position at which the receiving chamber is inserted into the receiving chamber is fixed (fixed in the vertical direction, but not rotatable), thus the solution outlet 2025 provided on the receiving front 202 is aligned with the solution inlet 2051 on the side wall of the detection chamber. Although the solution outlet and the solution inlet are in the same straight line, their positions are different and staggered. At the same time, a pair of elastic sealing rings 2023 are arranged on the outer wall of the receiving chamber, 2024 are positioned on the upper and lower sides of the solution outlet 2025, respectively, as shown in FIG. 11, so that when the receiving Chamber 202 is inserted into the receiving Chamber 2052, the bottom of the receiving Chamber is brought into contact with the bottom of the receiving Chamber, and a sealed Space 900 is formed on the inner wall of the receiving Chamber and the outer wall of the receiving Chamber, which seals the solution outlet 2025. At this time, the solution outlet is located below the solution inlet (as shown in FIG. 14). A collector 201 is provided with an end portion at one end, an absorbent element 2011 at the end portion, a structure 2012 similar to a cover body at the other end, the end portion being connected with the cover body through a rod 2012, and two protrusions 2044, 2043 at the end portion, which can be toothed with two protrusions 2026, 2027 arranged in the receiving chamber. There is also provided a sealed chamber 206 in which the treatment liquid is filled, the sealed chamber being arranged in advance at the bottom of the receiving chamber, and a piercing element 207 which is located on the sealed chamber (as shown in FIG. 14). A convex structure is provided near the opening of the receiving chamber 105, which is similar to the structure of an ear. The final assembled device is shown in FIG. 14. When the test is carried out. The liquid sample is first absorbed by the absorber element 201 of the collector, Such as a saliva sample, an absorbent element is then inserted into the receiving chamber, the absorbent element being in contact with a puncture structure disposed at the bottom of the receiving chamber, thereby pushing the puncture element to puncture the sealing chamber so that the puncture element enters the sealing chamber, thereby allowing the treatment liquid to flow out into the receiving chamber and come into contact with the absorbent element. The absorbent element 2011 is compressed, this releases a liquid sample, which is mixed with the treatment liquid, which is in contact with the absorption element. During compression, the two protrusions 2044, 2043 on the collector are toothed with the protrusions 2026, 2027 provided in the receiving chamber, so that the collector is locked with the receiving chamber while the absorption element 2011 is always in a compressed state (as shown in FIGS. 7, 9). When it is necessary to carry out inspection and testing, Hold the ear structure of the attachment of the opening of the receiving chamber by hand, Leaving the receiving chamber away from the bottom of the receiving chamber together with the collector, Moving from a lower first position to a second position, That is, until the position where the receiving chamber cannot be pulled, the solution outlet 2025 of the receiving chamber is aligned, aligned or communicated with the solution inlet 2051 of the detection chamber, so that the liquid (liquid sample or mixed solution of liquid sample and treatment liquid) located in the receiving chamber flows into the detection chamber and contacts with the test strip for testing.

All patents and publications mentioned in the specification of the invention indicate that the contents are disclosed techniques in the art and can be used by the present invention. All patents and publications cited herein are likewise listed as references, just as each publication is specifically and individually referenced. The invention described herein may be practiced in the absence of any element or elements, limitation or limitations, not specifically stated herein. For example, the terms "comprising," "consisting essentially of," and "consisting of" in each embodiment herein may be replaced with the remaining 2 terms of either. The term "a" or "an" herein means only "one" and does not exclude the inclusion of only one and can mean the inclusion of two or more. The terms and expressions employed herein have been used as terms of description and not of limitation, and there is no intention herein to indicate that the terms and explanations described herein exclude any equivalent features, but it is recognized that any suitable changes or modifications may be made within the scope of the invention and the claims. It will be appreciated that the described embodiments of the present invention are preferred embodiments and features, and that modifications and variations, which are within the scope of the invention and the scope of the appended claims, may be effected by a person of ordinary skill in the art without departing from the spirit and scope of the invention as defined by the appended claims.

The invention claimed is:

1. A device for detecting an analyte in a liquid sample, comprising:
   a receiving chamber, configured to receive an absorbent element; and
   a detection chamber,
   wherein the detection chamber is configured to receive a testing element; the testing element is configured to test the analyte in the liquid sample,
   wherein the receiving chamber is configured to be movable between a first position and a second position relative to the detection chamber, when the receiving chamber is at the first position, the receiving chamber is not in fluid communication with the detection chamber, and when the receiving chamber is at the second position, the receiving chamber is in fluid communication with the detection chamber, and
   wherein the receiving chamber comprises a solution outlet, the detection chamber comprises a solution inlet, and when the receiving chamber is located at the first position, the solution outlet of the receiving chamber is not aligned with the solution inlet of the detection chamber, and when the receiving chamber moves outwardly with the absorbent element to the second position, the solution outlet of the receiving chamber is aligned with the solution inlet of the detection chamber, and the liquid sample in the receiving chamber flows to the detection chamber.

2. The device according to claim 1, wherein the receiving chamber comprises a mixed solution.

3. The device according to claim 2, wherein the device further comprises a chamber containing the mixed solution, and when the absorbent element is in a process of compression, the mixed solution is allowed to flow from the mixed solution chamber to the receiving chamber to contact the absorbent element.

4. The device according to claim 3, wherein the mixed solution chamber is located within the receiving chamber, and the mixed solution chamber is sealed with a puncture-prone film.

5. The device according to claim 4, wherein the device further comprises a puncture element, and when the absorbent element is compressed, the absorbent element pushes the puncture element, so that the sealing film is punctured.

6. The device according to claim 5, wherein the puncture element is located within the receiving chamber and between the absorbent element and the mixed solution chamber.

7. The device according to claim 2, wherein the receiving chamber is sealed when the mixed solution is contained in the receiving chamber.

8. The device according to claim 1, wherein the absorbent element is in a state of being uncompressed or compressed within the receiving chamber.

9. The device according to claim 1, wherein the device further comprises an accommodating chamber accommodating the receiving chamber, and the receiving chamber is provided with the first position and the second position within the accommodating chamber.

10. The device according to claim 9, wherein a sealing element is provided between the receiving chamber and the accommodating chamber so as to prevent the liquid in the receiving chamber from flowing into the accommodating chamber during movement of the receiving chamber.

11. The device according to claim 10, wherein the sealing element is located between the solution outlet of the receiving chamber and the solution inlet of the detection chamber.

12. The device according to claim 11, wherein the solution inlet of the detection chamber is disposed on a sidewall of the accommodating chamber, and the detection chamber and the accommodating chamber share one sidewall.

13. The device according to claim 12, wherein the solution inlet of the detection chamber is located at downstream of the solution outlet of the receiving chamber.

14. The device according to claim 9, wherein a distance that the receiving chamber moves from the first position to the second position within the accommodating chamber is fixed.

* * * * *